Oct. 1, 1963
R. D. RUMSEY
3,105,392
TORSIONAL VIBRATION DAMPER
Filed Dec. 15, 1961
4 Sheets-Sheet 1
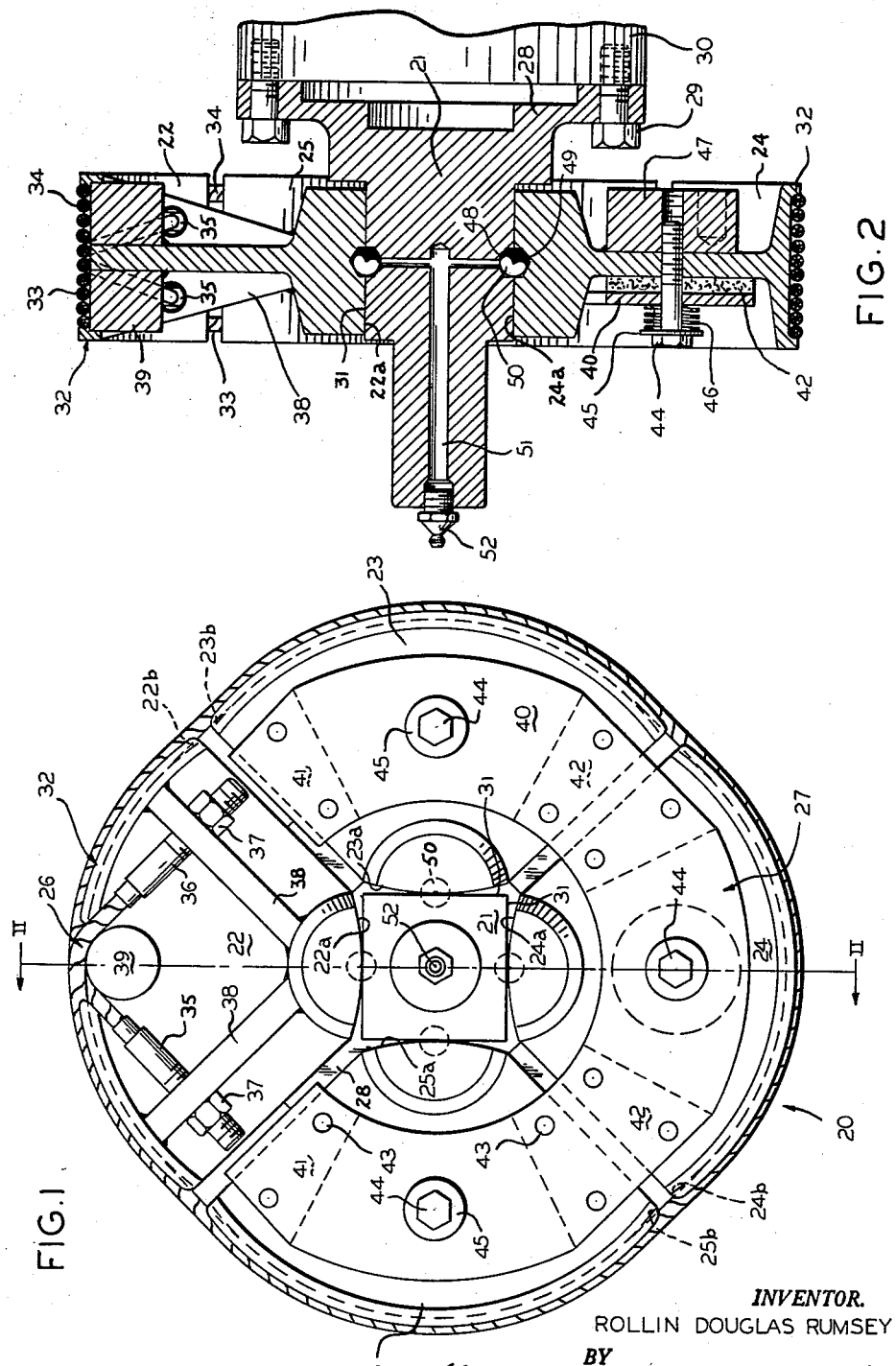
INVENTOR.
ROLLIN DOUGLAS RUMSEY
BY
ATTORNEYS Oct. 1, 1963  R. D. RUMSEY  3,105,392
TORSIONAL VIBRATION DAMPER
Filed Dec. 15, 1961  4 Sheets-Sheet 2

INVENTOR.
ROLLIN DOUGLAS RUMSEY
BY
ATTORNEYS

Oct. 1, 1963  R. D. RUMSEY  3,105,392
TORSIONAL VIBRATION DAMPER
Filed Dec. 15, 1961  4 Sheets-Sheet 3

INVENTOR.
ROLLIN DOUGLAS RUMSEY
BY
ATTORNEYS

Oct. 1, 1963    R. D. RUMSEY    3,105,392
TORSIONAL VIBRATION DAMPER
Filed Dec. 15, 1961    4 Sheets-Sheet 4

*INVENTOR.*
ROLLIN DOUGLAS RUMSEY
BY
ATTORNEYS

United States Patent Office 3,105,392
Patented Oct. 1, 1963

3,105,392
TORSIONAL VIBRATION DAMPER
Rollin Douglas Rumsey, Buffalo, N.Y., assignor to Houdaille Industries, Inc., Buffalo, N.Y., a corporation of Michigan
Filed Dec. 15, 1961, Ser. No. 159,647
29 Claims. (Cl. 74—574)

This invention relates generally to torsional vibration dampers, and more specifically to such dampers incorporating a resiliently biased inertia member of the pendulum type.

Although the principles of the present invention may be included in various torsional vibration dampers, a particularly useful application is made in dampers of the type that are adapted to be secured to the crankshaft of a diesel engine.

Torsional vibration dampers provided heretofore for such purpose have been of two functions, one of which detuned the natural frequency of the crankshaft, and the other of which retuned the natural or critical frequency to a value out of the operating frequency range. A typical detuning type of device includes rubber dampers which are characterized by limited life, especially under extremely severe service conditions, and which are incapable of operating at temperature extremes. A typical detuning device employs leaf springs which are susceptible to fatigue failure and loss of interleaf friction with wear. This type is also susceptible to malfunction in the presence of an oily environment or a corrosive environment. A further example of detuning damper depends upon centrifugal force to provide restoring torque, and which therefore can only be tuned to one frequency. This type further suffers from high unit stresses, extreme manufacturing accuracy requirements, and relatively rapid wear. A further type of known damper is an energy dissipater which pumps fluid, but which generally must be utilized within the engine crankcase in order to avoid excessive sealing problems.

The present invention contemplates the utilization of a hub member against which a radially biased inertia member is rockably supported, coupled with damping means for acting on such inertia member to retard rocking thereof.

Accordingly, it is an object of the present invention to provide an improved torsional vibration damper.

Another object of the present invention is to provide a torsional vibration damper of the tuned or detuning type having a somewhat longer life than known units of this type.

Yet another object of the present invention is to provide a torsional vibration damper which is capable of operating at temperature extremes.

A still further object of the present invention is to provide a structure for a tuned damper wherein the damper may be constructed of a smaller size than prior known units.

Yet another object of this invention is to provide a torsional vibration damper which may be used within or outside of a crankcase.

A still further object of this invention is to provide a torsional vibration damper which incorporates all of the foregoing objects in a single device.

Many other advantages, features and additional objects of the present invention will become manifest to those versed in the art upon making reference to the detailed description and the accompanying sheets of drawings in which preferred structural embodiments incorporating the principles of the present invention as shown by way of illustrative examples.

On the drawings:

FIGURE 1 is a plan view of a torsional vibration damper equipped with resiliently biased angularly-rockable inertia members provided in accordance with the principles of the present invention;

FIGURE 2 is a cross-sectional view taken along line II—II of FIGURE 1;

As shown on the drawings:

Figure 3:
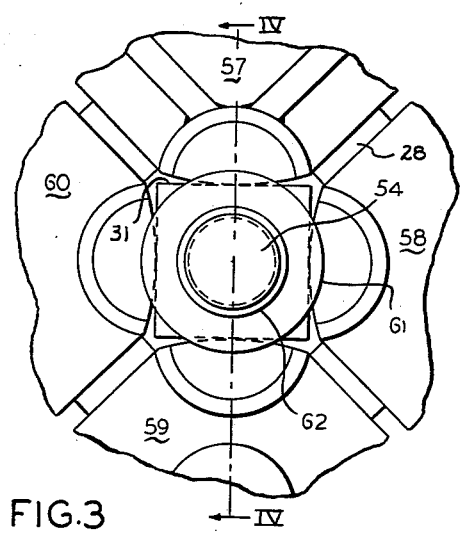
FIGURE 3 is a view corresponding to FIGURE 1, partly broken away, illustrating an alternative construction of means employed to retard rocking of the inertia members.

The principles of this invention are particularly useful when embodied in a torsional vibration damper or damper assembly such as illustrated in FIGURES 1 and 2, generally indicated by the numeral 20. The damper assembly includes a hub member 21, at least one inertia member, the instant embodiment incorporating a plurality of inertia members 22—25 inclusive, spring means generally indicated at 26, and damping means generally indicated at 27 for retarding any rocking of the inertia members 22—25.

The hub member 21 is adapted to be secured to a shaft 30 in which the torsional vibration is to be damped, and in this embodiment includes a mounting flange 28 which is integral with the hub member 21 and which is secured as by a number of bolts 29 to such shaft 30. The hub member 21 is provided with a radially directed surface means generally indicated at 31, which preferably is directed in a radially outward direction as shown.

Each of the inertia member 22-25 extends radially from the surface means 31, preferably in an outwardly direction, and includes an arcuate surface 22a–25a in rocking engagement with the surface means 31 of the hub member 21. The arcuate surfaces 22a–25a are here illustrated as being convex, and more specifically are preferably elliptic, an elliptic surface being that curve which renders the spring rate of the damper assembly 20 linear as a function of angular amplitude of the shaft 30. At an end or edge opposite to the arcuate surfaces 22a–25a, the respective inertia members are provided with a second arcuate surface 22b–25b. Preferably, the inertia members 22–25 are arranged in an annular pattern, and in this embodiment, the annular pattern not only encircles the rotational axis of the hub member 21, but also encircles the surface means 31.

The spring means 26 urges the inertia members 22–25 individually both against the hub member 21, and also urges the inertia members 22–25 rockingly to a radially erect position as illustrated. The spring means 26 is employed for all the inertia members 22–25, and to that end, extends about the axis of the hub member 21 in an annular fashion and also encircles the inertia members 22–25. The spring means 26 is supported by the inertia members 22–25 remotely from the hub member 21 and is angularly oscillatable about the axis of the hub member 21. Thus the mass of the spring means 26 comprises a part of the inertia mass of the damper assembly 20. The spring means 26 lies in engagement with the second arcuate surface 22b–25b to urge the inertia members 22–25 in a radially inward direction.

The damping means 27 is carried by at least one of the members 21–25 and is operative, as is explained below, to retard any rocking of the inertia members 22–25. Means indicated at 32 are also provided to retain the annular spring means 26 axially, such means 32 being secured to at least one of the members 21–25.

The description of this invention thus far given, except for reference numerals, applies to every embodiment and variation thereof disclosed herein.

In the embodiment shown in FIGURES 1 and 2, the radially directed surface means 31 of the hub member 21 comprises a series of radially directed flat surfaces, which jointly define a right prism. The spring means 26 comprises one or more metallic cables 33, 34 each being provided with threaded fittings 35, 36 and nuts 37 respectively extending through and against a pair of braces or anchors 38, 38 welded to the inertia member 22. The cables 33, 34 are directed over a radius member 39, also welded to the inertia member 22, for avoiding any sharp kink in the cable where it passes from the interior of the inertia member 22 to the outer arcuate surface 22b. As best seen in FIGURE 2, the cables 33 and 34, which comprise annular spring means, are axially retained by means 32 secured to the inertia members 22–25, which means in this embodiment includes axially spaced flanges on each inertia member 22–25 which define at least one groove at the outer arcuate surface 22b, the several flanges jointly extending about the axis of the hub member 21 and receiving the annular spring means 26 therebetween.

The damping means 27 in this embodiment is secured to and carried by the inertia members 23–25 and includes an arcuate plate 40 having a number of friction elements 41, 42 secured thereto as by rivets 43. As best seen in FIGURE 2, a plurality of screws 44 individually extend through washers 45 and compression springs 46, through the plate 40 into threads integral with or associated with the corresponding inertia members 23–25, the screw 44 of the inertia member 24 extending into an appropriately sized counterweight 47 which is diametrically opposite the radius member 39. Thus the individual friction elements 41, 42 are jointly arranged in an annular pattern, are resiliently loaded against the inertia members 23–25, in a radially coextending or overlapping manner, the friction elements 42 acting on adjacent inertia members. The compression springs 46 thus constitute further spring means which urge the adjacent inertia members into continual engagement with the various friction elements 41, 42.

In order to retain the inertia members 22–25 axially on the surface means 31, at the point of engagement therebetween, there is provided a recess 48 extending into the surface means 31, and a similar recess 49 aligned therewith extending into the arcuate surface 22a–25a. Within the recesses 48, 49 there is received a ball 50, preferably of steel, it being understood that the various recesses 48 may be joined together by appropriate channeling 51 to a grease fitting 52 through which grease is admitted to the various balls 50.

When an oscillation is imparted to the shaft 30, or typically when an angular oscillation is superimposed upon the rotation of the shaft 30, such oscillation will also be imposed upon the hub member 21. The hub member 21, in comprising the support for the inertia members 22–25 and spring means 26, will attempt to apply the same oscillation thereto. However, the inertia members and annular spring will jointly, due to their moment of inertia, lag in any such oscillation. Such tendency to lag imparts a rocking motion to each inertia member 22–25 which is opposed primarily by the frictional drag of the damping means 27, and also by the force of the spring member 26. As the shaft 30 and hub member 21 tend to lag in the opposite portion of an oscillation cycle, the inertia members 22–25 and spring means 26, still lagging, tend to keep the hub member rotating. Thus the torsional vibration damper 20 opposes the angular vibrations in the shaft 30 and tends to minimize or cancel them. It is thus to be noted that the disclosed embodiment of the spring means 26 also acts to retard any rocking of the inertia members. Thus, if the means 27 were omitted, the means 26 could and does comprise both spring means and damping means which retard rocking of inertia members.

Figure 4:
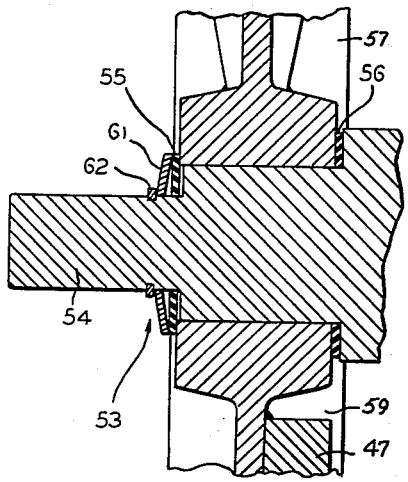
FIGURE 4 is a cross-sectional view, partly broken away, taken along line IV—IV of FIGURE 3.

Referring now to FIGURES 3 and 4, there is shown a variation of the structure shown in FIGURE 1 wherein the friction plate 40 and its friction elements 41 and 42 are replaced by damping means generally indicated at 53 carried by the hub member 54. In this variation, the damping means 53 includes a pair of axially spaced annular friction elements 55, 56, each disposed against the various inertia members 57–60, and axially retained on the hub member 54 by a washer-like member 61 and snap ring 62, the washer-like member preferably being dished to provide a spring loading between the inertia members 57–60 and the friction elements 55 and 56. Here also the friction elements 55 and 56 radially overlap and engage the several inertia elements 57–60. The friction elements 55 and 56 likewise abut against adjacent inertia members and the washer-like member 61 provides a further spring force which urges the various adjacent inertia members into continual engagement with the friction elements 55 and 56.

A device constructed in accordance with FIGURES 3 and 4 operates as already explained.

Figure 5:
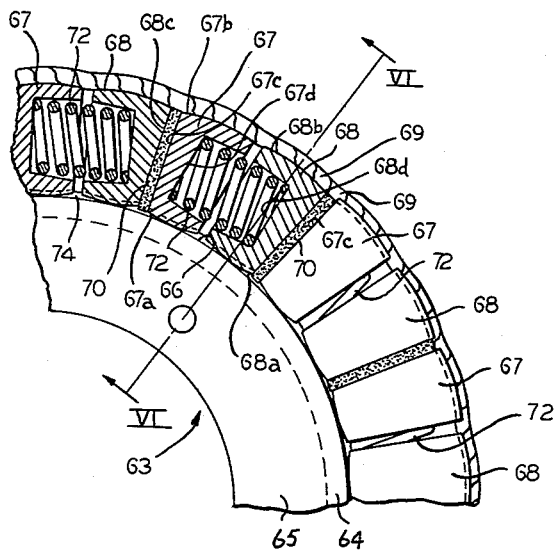
FIGURE 5 is a fragmentary plan view, partly broken away and sectioned, of a further embodiment of the instant invention.
Figure 6:
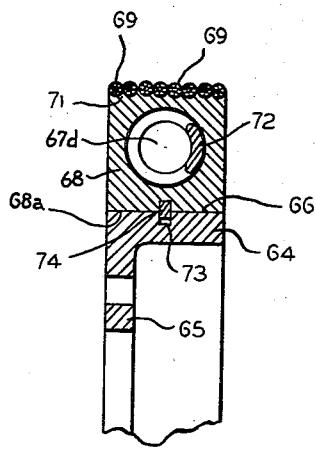
FIGURE 6 is a cross-sectional view taken along line VI—VI of FIGURE 5.

Referring now to FIGURES 5 and 6, there is shown a further embodiment of the instant invention. FIGURES 5 and 6 show a torsional vibration damper assembly 63 which includes a hub member 64 having an integral mounting flange 65 and a radially directed surface means 66 comprising a radially directed cylindrical surface. There is also provided a plurality of inertia members 67, 68 which extend radially outwardly from the outwardly radially directed surface means 66, and which are disposed in an annular pattern which encircles the surface means 66. Each of the inertia members 67, 68 has an arcuate surface 67a, 68a in rocking engagement with the surface means 66, and a second arcuate surface 67b, 68b on its opposite end, both of which arcuate surfaces are here shown to have convex elliptical configuration. Annular spring means 69 common to all the inertia members 67, 68, extend about the axis of the hub member 64, encircle all the inertia members 67, 68, are supported by the inertia members 67, 68 at an end thereof remote from the hub member 64, namely on the arcuate surfaces 67b, 68b to urge the various inertia members 67, 68 individually both radially inwardly against the hub member 64, and rockingly to a radially erect position as shown. Thus the annular spring means 69 are angularly oscillatable with and in response to any rocking motion of the inertia members 67, 68. The damping means 70 supplementing the damping of the spring means 69 are carried by the inertia members and are operative to retard any rocking thereof. This embodiment includes means 71 for axially retaining the annular spring means 69, the means 71 here comprising means on the inertia members 67, 68 jointly defining a number of annular grooves therein which extend about the axis of the assembly 63, and each of which receives a continuous annular spring 69 which comprises a cable.

The various inertia members 67, 68 include tangentially directed surfaces 67c, 68c which are adapted, in this embodiment, by the friction element 70, to coact. Preferably, the friction elements 70 are each secured to one of these surfaces and each comprise brake lining material or equivalent for retarding any rocking of the various inertia elements. In this embodiment, it will be noted that the friction elements 70 are disposed not only against adjacent inertia members, but are also disposed between alternate pairs of inertia members. A further spring means 72 is received in confronting recesses 67d, 68d in the inertia members 67 and 68, the spring means 72 acting to urge adjacent inertia members 67 and 68 into continual engagement with the adjacent friction elements, such as 70. Thus the individual springs 72 urge other alternate inertia members tangentially apart. To retain the several inertia members 67, 68 axially, there is provided a recess or annular groove 73 part of which is disposed in the surface means 66, and part of which extends into the arcuate surfaces 67a, 68a, and which recess or annular groove receives a retaining member or ring 74 therein. It is to be noted that the various recesses 67d and 68d are slightly bell-mounted so that slight angular rocking of each inertia member 67 and 68 may take place without causing binding with respect to the spring means 72.

Figure 7:
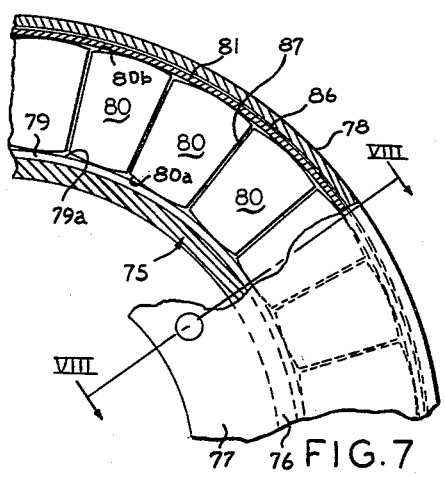
FIGURE 7 is a fragmentary elevational view, partly broken away and sectioned, of a further embodiment of the instant invention.
Figure 8:
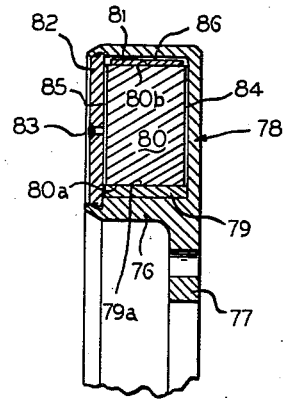
FIGURE 8 is a cross-sectional view taken along line VIII—VIII of FIGURE 7.

Referring now to FIGURES 7 and 8 there is shown a further embodiment of this invention, generally identified at 75. The torsional vibration damper 75 includes a hub member 76 having an integral mounting flange 77, and also having means generally indicated at 78 defining an annular liquid-tight housing. Within the housing 78, there is disposed a hardened ring 79 having a radially outwardly directed surface means 79a. Within the housing 78, there is disposed a series of inertia members 80 which extend radially from the ring 79, each of which has an arcuate surface 80a in rocking engagement with the surface means 79a. The several inertia members 80 extend outwardly from the ring 70 in an annular pattern which encircles the surface means 79a. Each arcuate surface 80a again is of a convex elliptical configuration. At the opposite end of each inertia member 80, there is a second or other arcuate surface 80b of similar configuration against which spring means 81 in the form of a steel band is disposed. The spring means 81 is of annular configuration, is common to all inertia members 80, extends about the axis of the hub member 76, encircles the inertia members 80, is supported by them remotely from the hub member 76 and acts on the arcuate surface 80b to urge the inertia members 80 individually both radially inwardly against the hub member 76 and rockingly to a radially erect position. Moreover, the spring means 81 is angularly oscillatable in response to any rocking of the inertia members 80. As such, it also forms part of the sprung inertia mass.

The housing 78 carried by the hub member 76 is further operative with silicone fluid to viscously retard any rocking of the inertia members 80. To this end, the housing 78 defines a sealed chamber which includes a cover member 82 sealed to the hub member at its inner and outer peripheries by use of crimping and sealing compound, and provided with a filler opening which is closed by a filler plug 83 after the housing chamber has been filled with an appropriate viscous damping fluid such as a silicone. The gaps 84, 85 at the axial faces of the inertia members 80, and the gap at 86 between the spring means 81 and the housing 78 are shown in exaggerated size for clarity, but actually comprise shear film spacing for applying a retarding force to limit rocking of the inertia members. The spacing 87 between adjacent inertia members 80, as best seen in FIGURE 7, also comprises shear film spacing, and if desired, may be decreased during operation in accordance with principles described below in connection with FIGURES 11 and 12. At any event, the tangentially directed surfaces which define the gap 87 are adapted to coact to retard rocking movement of such inertia members. The various components within the housing 78 are retained against any significant axial movement by the housing itself. The surface means 79a in this embodiment comprises a cylindrical surface.

Figure 9:
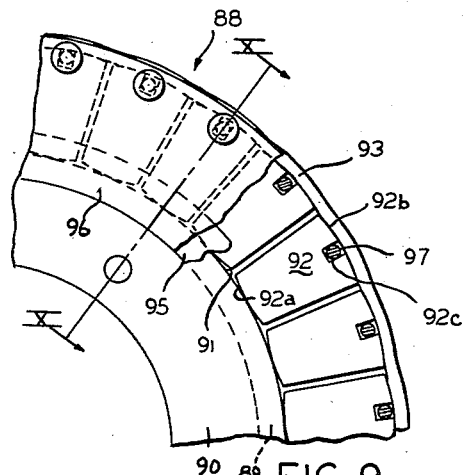
FIGURE 9 is a fragmentary elevational view, partially broken away and sectioned, of a still further embodiment of the instant invention.
Figure 10:
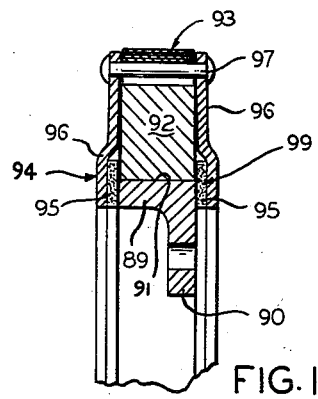
FIGURE 10 is a cross-sectional view taken along line X—X of FIGURE 9.

Referring now to FIGURES 9 and 10 there is shown a still further modification of the instant invention, generally indicated at 88. This torsional vibration damper 88 similarly includes a hub member 89 to which is attached an integral mounting flange 90, and which is provided with a radially outwardly directed surface means 91. The damper 88 also includes a plurality of inertia members 92, each of which has an arcuate surface 92a in rocking engagement with the surface means 91. The inertia members 92 extend radially in an outward direction from the surface means 91 and are disposed in an annular pattern which encircles the surface means 91. Likewise in this embodiment, the arcuate surface 92a is of convex elliptical configuration, and there is provided a similar second arcuate surface 92b on the opposite end of each inertia member 92. Similarly, there is also provided annular spring means 93 which urges the inertia members 92 individually both against the hub member 89 and rockingly to a radially erect position. The spring means 93 urges the inertia members 92 radially inwardly, and to that end is common to all the inertia members 92, extends about the axis of the hub member 89, encircles the inertia members 92, is supported by them remotely from the hub member 89 at the second arcuate surface 92b, and is therefore angularly oscillatable therewith in response to rocking thereof so that the annular spring means 93 is part of the sprung mass. This embodiment also includes damping means generally indicated at 94 which coacts with the spring means 93 to retard any rocking of the inertia members 92. The structure of the damping means 94 includes means which is operative to retain the annular spring means 93 axially.

The damping means 94 includes a friction element 95, such as of brake lining material, disposed against the hub member 89, there being two such elements included in the instant embodiment. The damping means 94 further includes a pair of annular disks 96, 96 formed in a dished configuration to comprise a Belleville spring, so that when the disks 96 are urged together by a series of rivets 97, the friction material 95 is in engagement with both the hub member 89, the disks 96, and is also disposed in radially overlapping relation with the inertia members 92. Each of the inertia members is slotted as indicated at 92c to receive one of the rivets 97. Thus, when the series of inertia members 92 rock individually, each of them acts on one of the rivets 97 to pivot the disks 96 slightly with respect to the hub member 89 which pivoting and rocking is thus retarded by the friction elements 95. The damping means 94 are thus secured to the hub member 89 and are also secured to the inertia members 92. The friction element 95 thus engages both the hub member 89 and the inertia members 92, are of annular configuration which radially overlaps such members, and are resiliently loaded against adjacent inertia members 92; the spring means or disks 96 thus also continually urge or bias engagement between the friction elements and inertia members. Each of the disks 96 is radially extended to define a groove, which disks 96 are both secured to the inertia members 92 and are engageable with the annular spring means 93.

The annular spring means 93 comprises a plurality of concentric annular laminations which are mutually joined together as a unit. The individual laminations may comprise steel shim stock, for example, of a thickness of .002 inch each, or fiber-glass tape. The individual laminations are preferably bonded together, such as by an epoxy resin.

Figure 11:
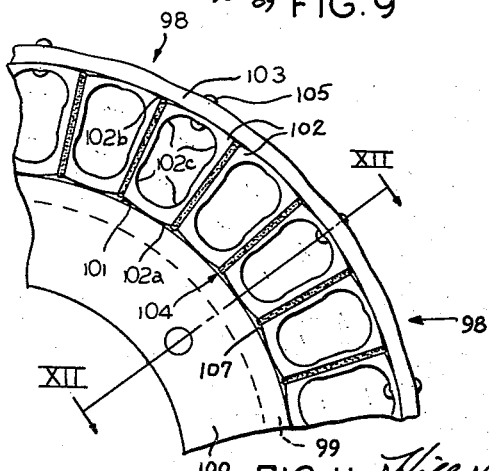
FIGURE 11 is a fragmentary elevational view of a still further embodiment of this invention, partly broken away.
Figure 12:
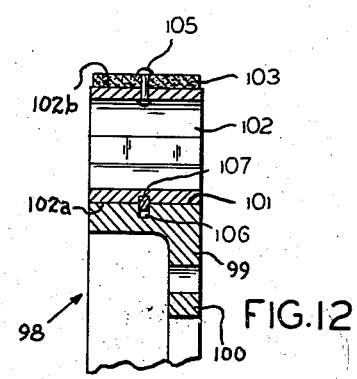
FIGURE 12 is a cross-sectional view taken along line XII—XII of FIGURE 11.

FIGURES 11 and 12 show a further embodiment of this invention, the torsional vibration damper being generally indicated at 98. The damper assembly 98 includes a hub member 99 having an integral mounting flange 100, and a radially outwardly directed surface means 101 against which a plurality of inertia members 102 are biased as by an annular spring means 103. Each of the inertia members 102 has an arcuate surface 102a, here illustrated as being of convex elliptical configuration, disposed in rocking engagement with the surface means 101. A second similar arcuate surface 102b is disposed at the opposite end of each of the inertia members 102 in engagement with the spring means 103. The inertia members 102 are arranged in an annular pattern, which pattern encircles the surface means 101. The annular spring means 103 urges the individual inertia members 102 both radially inwardly against the hub member 99 and rockingly to a radially erect position. The annular spring means 103 thus is common to all of the inertia members 102, extends about the axis of the hub member 99, encircles the various inertia members 102 and acts on their arcuate surfaces 102b to urge them as described. The spring means 103 is supported by the inertia members 102 remotely from the hub member 99 and is angularly oscillatable therewith and thus forms a part of the sprung inertia mass. Damping means generally indicated at 104 are provided to retard the rocking of the inertia members 102. The annular spring means 103 is retained by means 105, here comprising a rivet secured to and extending through both the annular spring means 103 and a portion of alternate inertia members 102.

The surface means 101, as in FIGURES 5, 7, and 9, is cylindrical. Each of the inertia members 102 is hollow as shown, and each includes a plurality of tangentially directed points of weakness 102c. These points of weakness render the individual inertia member 102 distortable in response to rocking. The slight distortion that occurs during rocking increases the effectiveness of the damping, the slight distortion comprising a slight tangential expansion of the various inertia members. In this embodiment, damping means 104 may be provided between each pair of inertia members, and for convenience, may be secured to one tangential face of one of them. Thus the friction element of the damping means engages the inertia member in a slipping manner to retard any rocking thereof since the friction elements are disposed against adjacent inertia members 102. As best seen in FIGURE 12, there is a recess or annular groove 106 which extends through the surface means 101 and the arcuate surfaces 102a, and within which a retaining ring or member 107 is disposed for retaining the inertia members 102 axially. During operation, the annular spring means 103 tends to distort the inertia members 102 and to urge one against the next one, thereby developing a frictional force proportional to the tension in the annular spring 103. Thus, with this feature included in the damper 98, the friction force increases with the angular vibration amplitude.

The annular spring means 103 comprises a group of annular elements of substantially circular cross-section mutually joined together in parallel as a unit. Each annular element may comprise steel wire or fiber-glass filaments, and epoxy resin may be used to advantage to bond the various elements together as a unit.

Figure 13:
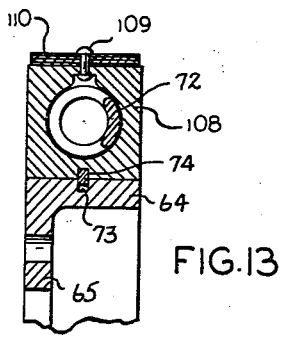
FIGURE 13 is a cross-sectional view of a still further embodiment of the present invention, wherein features from FIGURES 6, 10, and 12 are combined.

A further structural variation is illustrated in FIGURE 13. This structure is generally similar to that shown in FIGURES 5 and 6 and includes a series of inertia members 108, at least some of which are apertured to receive a rivet 109 which extends through annular spring means 110 to retain the annular spring means 110 axially. The annular spring means 110 is identical to the annular spring means 93, except for the apertures. Other features of this structure variation are the same as already described for FIGURES 5 and 6.

Figure 14:
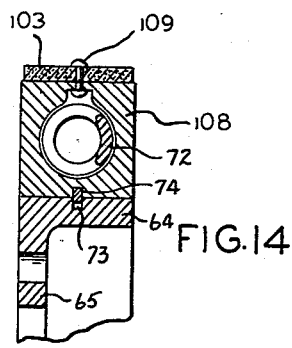
FIGURE 14 is a cross-sectional view of yet another embodiment of the instant invention, wherein features from FIGURES 6 and 12 are combined.

FIGURE 14 shows a further structural variation which is similar to that shown in FIGURE 13 except that the annular spring means 103, described above in connection with FIGURES 11 and 12, are used therein.

Figure 15:
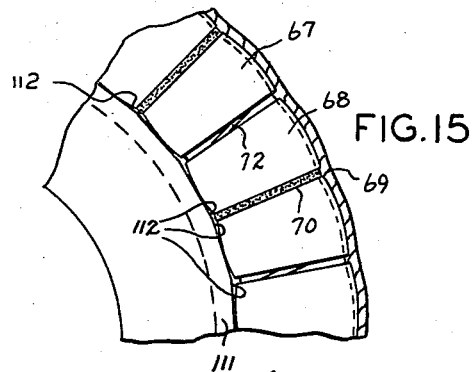
FIGURE 15 is a fragmentary view illustrating a modification of the structure shown in FIGURE 5.

FIGURE 15 illustrates a further structural variation of the embodiment shown in FIGURES 5 and 6 wherein there is provided a hub member 111 having surface means 112, the surface means 112 comprising a series of radially directed flat surfaces which jointly define a right prism. The other structural features of this device are the same as that described for FIGURES 5 and 6.

Figure 16:
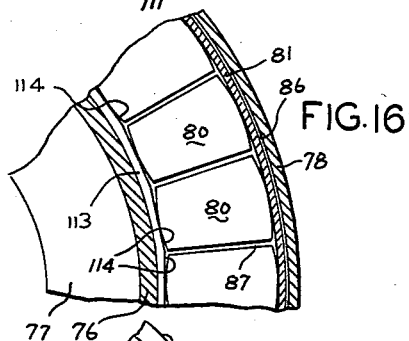
FIGURE 16 is a fragmentary view illustrating a similar modification of the structure shown in FIGURE 7.

FIGURE 16 illustrates a structural variation of the device shown in FIGURES 7 and 8 wherein the hub member 76 is provided with a separate or integral hardened wear ring 113 having surface means 114 which comprises a series of radially directed flat surfaces jointly defining a right prism. Other structural features are the same as that described above for FIGURES 7 and 8.

Figure 18:
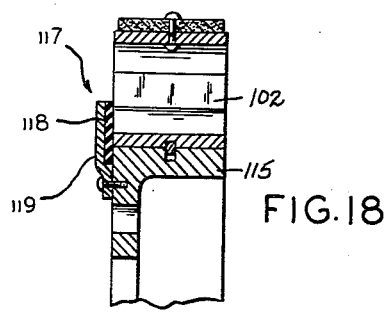
FIGURE 18 is a cross-sectional view taken along line XVIII—XVIII of FIGURE 17, which further illustrates structure for retarding rocking of inertia elements similar to that shown in FIGURE 4.
Figure 17:
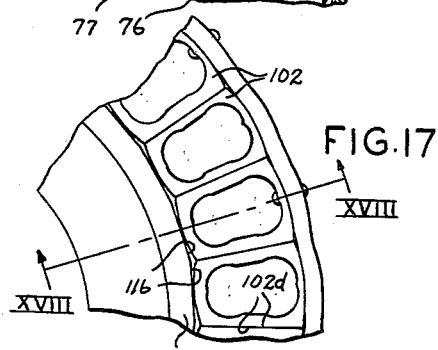
FIGURE 17 is a fragmentary view of a similar modification of the structure shown in FIGURE 11.

FIGURES 17 and 18 further illustrate the fact that various disclosed features herein may be combined as desired. This embodiment includes a hub member 115 provided with surface means 116 which comprises a series of radially directed flat surfaces which jointly define a right prism against which the inertia members 102 bear and rock. In this embodiment, the tangentially directed faces 102d of the inertia members 102 bear directly against each other in a rubbing or frictional manner. If desired, as shown in FIGURE 18, additional damping means generally indicated at 117 may be provided which includes a friction element 118 of annular configuration supported by a resilient disk 119 which is secured to the hub member 115 in any convenient manner. Thus the friction element 118 is resiliently loaded, is of annular configuration, and radially overlaps and engages the inertia members 102 whose tangentially directed faces 102d coact therewith to retard rocking of the inertia members 102. Thus, also, the resilient disk 119 comprises further spring means which urges a continual engagement between the friction element 118 and the adjacent inertia members 102.

All of the various damper embodiments and variations disclosed herein are further similar in that each has a spring rate which may be selected by appropriate selections of design parameters. The spring rate for any one of the embodiments and variations shown herein may be calculated by use of the formula $$K = A[+cB]$$

where $K =$ spring rate of the damper assembly.

$$A = \frac{2\pi R_1^2 (R_2 + R_3 - h) \sin R_1\theta/R_k}{R_k \theta (R_1 - R_3 + h)}$$

$L =$ preload in the annular spring.
$c =$ spring rate of the annular spring.

$$B = 2N \sin \frac{\pi}{N}\sqrt{D} - E.$$

$$D = (R_1 + R_2)^2 + (R_2 + R_3 - h)^2$$
$$- 2(R_2 + R_3 - h) \cos \frac{R_1\theta}{R_k}(R_1 + R_2).$$

$$E = 2N(R_1 - R_3 + h) \sin \frac{\pi}{N}.$$

$R_1$ = radius of the hub member's surface means.
$R_2$ = radius of the arcuate surface of the inertia member.
$R_3$ = radius of the inertia member adjacent to the spring means.
$h$ = height of inertia member.
$R_k$ = radius of gyration of the combined inertia member plus annular spring means.
$N$ = number of inertia members.
$\theta$ = angular deflection of the inertia mass.

Figure 19:
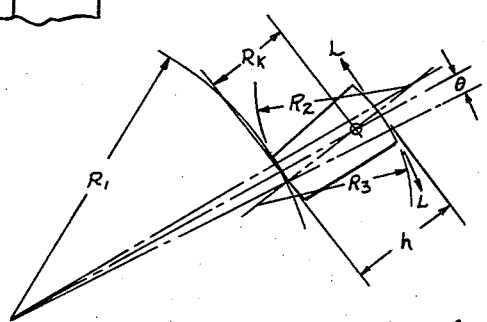
FIGURE 19 is a diagram illustrating dimensions employed in calculating the spring rate of a torsional vibration damper constructed in accordance with the principles of the present invention.

The foregoing individual dimensions are also illustrated diagrammatically in FIGURE 19.

It is to be understood that the various features disclosed in individual figures herein may be combined in various other manners as may be desired. By way of example, the hollow inertia blocks 102 may be used in other combinations. In all of these various embodiments of the instant invention, it will be noted that the center of mass of the sprung mass comprises a number of points, each of which is radially beyond the pivot point of engagement with the hub of each individual inertia member, and that such centers of mass jointly define a circular pattern. A typical spring rate of the dampers illustrated would be on the order of 1,000,000 pound-inches per radian, for a typical 10-inch diameter damper.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A torsional vibration damper, comprising, in combination:
   (a) a hub member adapted to be mounted for rotation about its axis, said hub member having radially outwardly directed surface means;
   (b) at least one inertia member extending radially outwardly from said hub member, and having an arcuate surface in rocking engagement with said surface means of said hub member;
   (c) spring means urging said inertia member both radially inward against said hub member and to a radially erect position; and
   (d) damping means carried by one of said members and operative to retard any rocking of said inertia member.

2. A torsional vibration damper, comprising, in combination:
   (a) a hub member adapted to be mounted for rotation about its axis, said hub member having radially directed surface means;
   (b) at least one inertia member extending radially from said hub member, and having a pair of elliptic surfaces on opposite ends thereof, one of which elliptic surfaces is in rocking engagement with said surface means of said hub member;
   (c) spring means acting on the other elliptic surface of said inertia member and urging said inertia member both radially against said hub member and rockingly to a radially erect position; and
   (d) damping means carried by one of said members and operative to retard any rocking of said inertia member.

3. A tortional vibration damper, comprising, in combination:
   (a) a hub member adapted to be mounted for rotation about its axis, said hub member having radially outwardly directed surface means;
   (b) a plurality of inertia members, each extending radially outwardly from said hub member, said inertia members being disposed in an annular pattern encircling said surface means of said hub member, and each having an arcuate surface in rocking engagement with said surface means of said hub member;
   (c) annular spring means encircling said inertia members and urging said inertia members radially inward into individual engagement with said hub member at said surface means thereof, and to a radially erect position; and
   (d) damping means carried by one of said members and operative to retard any rocking of said inertia members.

4. A torsional vibration damper, comprising, in combination:
   (a) a hub member adapted to be mounted for rotation about its axis, said hub member having radially outwardly directed surface means;
   (b) a plurality of inertia members, each extending radially outwardly from said hub member, said inertia members being disposed in an annular pattern encircling said surface means of said hub member, and each having a pair of arcuate surfaces on opposite ends thereof, one of which arcuate surfaces is in rocking engagement with said surface means of said hub member;
   (c) annular spring means encircling said inertia members and supported by said inertia members for angular oscillation about the axis of said hub member, said spring means acting on the other arcuate surface of said inertia members and urging said inertia members individually both radially inward against said hub member and rockingly to a radially erect position;
   (d) damping means carried by one of said members and operative to retard any rocking of said inertia members; and
   (e) means, secured to at least one of said members, and operative to retain said annular spring means axially.

5. A torsional vibration damper, comprising, in combination:
   (a) a hub member adapted to be mounted for rotation about its axis, said hub member having a series of radially directed flat surfaces jointly defining a right prism;
   (b) a plurality of inertia members each extending radially from said hub member, and each having an arcuate surface in rocking engagement with one of said flat surfaces of said hub member;
   (c) spring means common to all of said inertia members and urging them severally against said hub member, and to a radially erect position; and
   (d) damping means carried by one of said members and operative to retard any rocking of said inertia members.

6. A torsional vibration damper, comprising, in combination:
   (a) a hub member adapted to be mounted for rotation about its axis, said hub member having a rigid radially directed cylindrical surface of constant radius concentric with said axis;
   (b) a plurality of inertia members each extending radially from said hub member, and each having an arcuate surface in rocking engagement with said cylindrical surface of said hub member, said arcuate surface having a radius longer than half the distance in the same direction across said inertia member;
   (c) spring means common to all of said inertia members and urging them severally against said hub member, and to a radially erect position; and
   (d) damping means carried by one of said members and operative to retard any rocking of said inertia members.

7. A torsional vibration damper, comprising, in combination:
   (a) a hub member adapted to be mounted for rotation about its axis, said hub member having radially directed surface means;

(b) a plurality of inertia members, each extending radially from said hub member, said inertia members being disposed in an annular arrangement about the axis of said hub member, and each having an arcuate surface in rocking engagement with said surface means of said hub member;

(c) annular spring means extending about the axis of said hub member and urging said inertia members into individual engagement with said hub member at said surface means thereof, and to a radially erect position;

(d) damping means carried by one of said members and operative to retard any rocking of said inertia members; and (e) each of said inertia members also having a second arcuate surface remote from said hub member, the second arcuate surfaces of said inertia members having means defining at least one groove therein extending about the axis of said hub member and receiving said annular spring means, said groove-defining means retaining said spring means axially.

8. A torsional vibration damper, comprising, in combination:

(a) a hub member adapted to be mounted for rotation about its axis, said hub member having radially outwardly directed surface means;

(b) a plurality of inertia members, each extending radially outwardly from said hub member, said inertia members being disposed in an annular pattern encircling said surface means of said hub member, and each having an arcuate surface in rocking engagement with said surface means of said hub member;

(c) annular spring means comprising metallic cable encircling said inertia members and urging said inertia members radially inward into individual engagement with said hub member at said surface means thereof, and to a radially erect position; and (d) damping means carried by one of said members and operative to retard any rocking of said inertia members.

9. A torsional vibration damper, comprising, in combination:

(a) a hub member adapted to be mounted for rotation about its axis, said hub member having radially outwardly directed surface means;

(b) a plurality of inertia members, each extending radially outwardly from said hub member, said inertia members being disposed in an annular pattern encircling said surface means of said hub member, and each having an arcuate surface in rocking engagement with said surface means of said hub member;

(c) annular spring means comprising a plurality of concentric annular laminations mutually joined together as a unit encircling said inertia members and urging said inertia members radially inward into individual engagement with said hub member at said surface means thereof, and to a radially erect position; and (d) damping means carried by one of said members and operative to retard any rocking of said inertia members.

10. A torsional vibration damper, comprising, in combination:

(a) a hub member adapted to be mounted for rotation about its axis, said hub member having radially outwardly directed surface means;

(b) a plurality of inertia members, each extending radially outwardly from said hub member, said inertia members being disposed in an annular pattern encircling said surface means of said hub member, and each having an arcuate surface in rocking engagement with said surface means of said hub member;

(c) annular spring means comprising a group of annular elements of substantially circular cross section mutually joined together in parallel as a unit encircling said inertia members and urging said inertia members radially inward into individual engagement with said hub member at said surface means thereof, and to a radially erect position; and (d) damping means carried by one of said members and operative to retard any rocking of said inertia members.

11. A torsional vibration damper, comprising, in combination:

(a) a hub member adapted to be mounted for rotation about its axis, said hub member having radially directed surface means;

(b) a plurality of inertia members each extending radially from said hub member, and each having an arcuate surface in rocking engagement with said surface means of said hub member;

(c) spring means common to all of said inertia members and urging them severally against said hub member, and to a radially erect position; and (d) a resiliently loaded annular friction element secured to said hub member and extending radially in overlapping and engaging relation to said inertia members to retard any rocking thereof.

12. A torsional vibration damper, comprising, in combination:

(a) a hub member adapted to be mounted for rotation about its axis, said hub member having radially directed surface means;

(b) a plurality of inertia members each extending radially from said hub member, and each having an arcuate surface in rocking engagement with said surface means of said hub member;

(c) spring means common to all of said inertia members and urging them severally against said hub member, and to a radially erect position; and (d) a friction element disposed against adjacent inertia members and engageable therewith in a manner to retard any rocking thereof.

13. A torsional vibration damper, comprising, in combination:

(a) a hub member adapted to be mounted for rotation about its axis, said hub member having radially directed surface means;

(b) a plurality of inertia members each extending radially from said hub member, and each having an arcuate surface in rocking engagement with said surface means of said hub member;

(c) spring means common to all of said inertia members and urging them severally against said hub member, and to a radially erect position;

(d) a friction element disposed against adjacent inertia members and engageable therewith; and (e) further spring means urging said adjacent inertia members into continual engagement with said friction element.

14. A torsional vibration damper, comprising, in combination:

(a) a hub member adapted to be mounted for rotation about its axis, said hub member having radially directed surface means;

(b) a plurality of inertia members each extending radially from said hub member, and each having an arcuate surface in rocking engagement with said surface means of said hub member;

(c) spring means common to all of said inertia members and urging them severally against said hub member, and to a radially erect position;

(d) a plurality of friction elements disposed between alternate inertia members and engageable therewith; and (e) a plurality of expansion springs disposed between other alternate inertia members, and urging said other inertia members tangentially apart and into continual engagement with one of said friction elements.

15. A torsional vibration damper, comprising, in combination:
(a) a hub member adapted to be mounted for rotation about its axis, said hub member having radially directed surface means;
(b) a plurality of inertia members each extending radially from said hub member, and each having an arcuate surface in rocking engagement with said surface means of said hub member;
(c) spring means common to all of said inertia members and urging them severally against said hub member, and to a radially erect position;
(d) damping means carried by one of said members and operative to retard any rocking of said inertia members;
(e) means defining a recess lying jointly in said arcuate surface of said inertia members and in said surface means of said hub member; and
(f) a retaining member received in said recess for restraining axial movement of said inertia members relative to said hub member.

16. A torsional vibration damper, comprising, in combination:
(a) a hub member adapted to be mounted for rotation about its axis, said hub member having radially directed surface means;
(b) a plurality of inertia members, each extending radially from said hub member, said inertia members being disposed in an annular arrangement about the axis of said hub member, and each having an arcuate surface in rocking engagement with said surface means of said hub member;
(c) annular spring means extending about the axis of said hub member and urging said inertia members into individual engagement with said hub member at said surface means thereof, and to a radially erect position;
(d) damping means carried by one of said members and operative to retard any rocking of said inertia members; and
(e) means secured to said inertia members and engageable with said annular spring means to retain said annular spring means axially.

17. A torsional vibration damper, comprising, in combination:
(a) a hub member adapted to be mounted for rotation about its axis, said hub member having radially directed surface means;
(b) a plurality of hollow inertia members each extending radially from said hub member, and each having an arcuate surface in rocking engagement with said surface means of said hub member;
(c) spring means secured to a number of said hollow inertia members and urging said inertia members severally against said hub member, and to a radially erect position; and
(d) damping means carried by one of said members and operative to retard any rocking of said hollow inertia members;
(e) said spring means being operative to distort said hollow inertia members slightly, in response to any rocking thereof away from said radially erect position, to increase the effectiveness of said damping means.

18. A torsional vibration damper, comprising, in combination:
(a) a hub member adapted to be mounted for rotation about its axis, said hub member having radially directed surface means;
(b) a plurality of hollow inertia members each extending radially from said hub member, and each having an arcuate surface in rocking engagement with said surface means of said hub member, each of said hollow inertia members having a plurality of tangentially directed points of weakness;
(c) spring means secured to a number of said hollow members remotely from said points of weakness and urging them severally against said hub member, and to a radially erect position; and
(d) damping means including tangentially directed surfaces on adjacent inertia members adapted to coact to retard any rocking of said hollow inertia members;
(e) said spring means being operative to slightly expand said hollow inertia members tangentially, in response to any rocking thereof away from said radially erect position, to increase the effectiveness of said damping means.

19. A torsional vibration damper, comprising in combination:
(a) a hub member adapted to be mounted for rotation about its axis, said hub member having radially directed surface means;
(b) a plurality of inertia members each extending radially from said hub member, and each having an arcuate surface in rocking engagement with said surface means of said hub member;
(c) spring means common to all of said inertia members and urging them severally against said hub member, and to a radially erect position; and
(d) damping means including tangentially directed surfaces on adjacent inertia members adapted to coact to retard any rocking of said inertia members.

20. A torsional vibration damper, comprising, in combination:
(a) a hub member adapted to be mounted for rotation about its axis, said hub member having radially directed surface means;
(b) a plurality of inertia members each extending radially from said hub member, and each having an arcuate surface in rocking engagement with said surface means of said hub member;
(c) spring means common to all of said inertia members and urging them severally against said hub member, and to a radially erect position;
(d) a friction element disposed against adjacent inertia members and engageable therewith; and
(e) further spring means operative to maintain a continual engagement between said friction element and said adjacent inertia members.

References Cited in the file of this patent

UNITED STATES PATENTS

| | | |
|---|---|---|
| 2,079,226 | Sarazin | May 4, 1937 |
| 2,966,074 | Rumsey | Dec. 27, 1960 |

FOREIGN PATENTS

| | | |
|---|---|---|
| 501,997 | Canada | May 4, 1954 |
| 1,032,572 | France | Apr. 1, 1953 |